(12) United States Patent
Nagashima et al.

(10) Patent No.: US 8,104,625 B2
(45) Date of Patent: Jan. 31, 2012

(54) MICROPOROUS MEMBRANE MADE OF POLYOLEFINS

(75) Inventors: Yusuke Nagashima, Kurashiki (JP); Hidenobu Takeyama, Kawasaki (JP); Daisuke Inagaki, Moriyama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 302 days.

(21) Appl. No.: 11/596,844

(22) PCT Filed: May 19, 2005

(86) PCT No.: PCT/JP2005/009157
§ 371 (c)(1),
(2), (4) Date: Nov. 17, 2006

(87) PCT Pub. No.: WO2005/113657
PCT Pub. Date: Dec. 1, 2005

(65) Prior Publication Data
US 2007/0221568 A1 Sep. 27, 2007

(30) Foreign Application Priority Data

May 20, 2004 (JP) .................... 2004-150856
May 21, 2004 (JP) .................... 2004-151439

(51) Int. Cl.
*B05D 5/00* (2006.01)

(52) U.S. Cl. .......... 210/500.27; 210/500.36; 427/243; 427/244; 264/41; 264/210.6; 264/210.3; 264/210.5; 264/211; 264/211.2; 264/211.19; 264/347

(58) Field of Classification Search ............. 210/500.27, 210/500.28, 500.33, 500.36, 500.34, 500.42, 210/500.21, 490; 264/41, 210.6, 210.3, 210.5, 264/211, 211.2, 211.19, 347; 427/243–246
See application file for complete search history.

(56) References Cited

U.S. PATENT DOCUMENTS

| 5,240,655 | A * | 8/1993 | Troffkin et al. ............. 264/28 |
| 5,683,634 | A * | 11/1997 | Fujii et al. ................. 264/41 |
| 5,759,678 | A * | 6/1998 | Fujii et al. ............... 428/315.5 |
| 5,786,396 | A * | 7/1998 | Takita et al. ............... 521/64 |
| 6,057,060 | A * | 5/2000 | Yu ........................ 429/247 |
| 6,153,133 | A * | 11/2000 | Kaimai et al. .............. 264/41 |
| 6,168,858 | B1 * | 1/2001 | Hasegawa et al. ......... 428/315.5 |
| 6,245,272 | B1 * | 6/2001 | Takita et al. ............. 264/210.4 |
| 6,666,969 | B1 * | 12/2003 | Funaoka et al. .......... 210/500.36 |
| 7,479,243 | B2 * | 1/2009 | Funaoka et al. ............. 264/41 |

FOREIGN PATENT DOCUMENTS

| JP | 5-234578 | 9/1993 |
| JP | 6-212006 | 8/1994 |
| JP | 6234875 | 8/1994 |

(Continued)

*Primary Examiner* — Tony G Soohoo
*Assistant Examiner* — David C Mellon
(74) *Attorney, Agent, or Firm* — Finnegan, Henderson, Farabow, Garrett & Dunner, L.L.P.

(57) ABSTRACT

A microporous membrane made of polyolefins which comprises polyethylene (PEA) 8-60 wt. % of which is accounted for by components having a molecular weight of 10,000 or lower and in which the ratio of the weight-average molecular weight (Mw) to the number-average molecular weight (Mn), Mw/Mn, is 11-100 and the viscosity-average molecular weight (Mv) is 100,000-1,000,000 and polypropylene, and which has a content of components having a molecular weight of 10,000 or lower of 8-60 wt. %, a porosity of 20-95%, and a degree of thermal shrinkage at 100° C. of 10% or lower.

4 Claims, 2 Drawing Sheets

FOREIGN PATENT DOCUMENTS

| | | |
|---|---|---|
| JP | 6234876 | 8/1994 |
| JP | 8-20659 | 1/1996 |
| JP | 9-180699 A | 7/1997 |
| JP | 10-17702 | 1/1998 |
| JP | 11-60789 A | 3/1999 |
| JP | 2-94356 | 4/1999 |
| JP | 11-92587 | 4/1999 |
| JP | 11-106533 | 4/1999 |
| JP | 2001-72788 | 3/2001 |
| JP | 2001-72792 | 3/2001 |
| JP | 2002-194132 A | 7/2002 |
| JP | 2002-284918 A | 10/2002 |
| JP | 2003-217554 | 7/2003 |
| JP | 2003-231772 | 8/2003 |
| JP | 2004-18838 A | 1/2004 |
| WO | WO 9720883 | 6/1997 |

* cited by examiner

MICROPOROUS MEMBRANE MADE OF POLYOLEFINS

TECHNICAL FIELD

The present invention relates to a microporous membrane commonly used, for example, for separation and selective permeation of substances and as a separating member for an electrochemical reaction apparatus such as a cell or a condenser. The invention relates to, in particular, a microporous membrane made of polyolefins which is suitably used as a separator for lithium ion cell.

BACKGROUND ART

Microporous membranes made of polyolefins are commonly used, for example, for separation and selective permeation of various substances and as separating members. Specifically, they are used, for example, as microfiltration membranes, separators for fuel cell or condenser, matrices for functional membranes for packing a functional material in pores to impart a novel function, and separators for cell. When used for such purposes, they are suitably used, in particular, as separators for lithium ion cells for notebook-sized personal computers, mobile phones, digital cameras and the like. The reason is, for example, that they have not only characteristics such as mechanical strength and permeability but also pore-clogging properties and heat resistance.

The term "pore-clogging properties" used here means the following capability: when the interior of a cell is overheated by overcharge or the like, the microporous membrane is melted to clog its pores, so that the cell reaction is stopped, resulting in assurance of the safety of the cell. It is considered that the effect on the safety is increased with a lowering of a temperature at which the pores are clogged. The term "heat resistance" used here means a capability to retain a shape for the maintenance of insulation between electrodes even at a high temperature. The microporous membrane is required to have a low thermal shrinkage stress and to be unbreakable, at a high temperature.

In patent documents 1 to 3, the present applicant has proposed a microporous membrane improved in pore-clogging properties by employment of low-melting polyethylenes such as copolymerized polyethylenes and low-density polyethylenes as some or all of components. When such a method is adopted, the pore-clogging properties are improved but the heat resistance is liable to be deteriorated.

In patent documents 4 to 6, microporous membranes containing wax are proposed. When such a method is adopted, the pore-clogging properties are improved but the homogeneity of a starting material for the microporous membrane is decreased, so that the quality of the membrane tends to be lowered, for example, non-molten matters remain in the membrane. In addition, it is presumed that when such a method is adopted, the heat resistance is unavoidably deteriorated.

In patent documents 7 to 9 and in patent documents 10 to 12 by the present applicant, there have been proposed microporous membranes obtained by using a two-stage polymerization polyethylene alone or a blend of a single-stage polymerization polyethylene having a high molecular weight and a single-stage polymerization polyethylene having a low molecular weight. In the former method, the employment of the two-stage polymerization polyethylene permits discharge at a high polymer concentration. But the microporous membrane is insufficient in heat resistance and moreover, its degree of thermal shrinkage is presumed to be high because of insufficient thermal fixation. On the other hand, in the latter method, the polyethylene component having a high molecular weight is effective in improving the heat resistance, while the polyethylene component having a low molecular weight is effective in improving the pore-clogging properties. Therefore, such a method makes it possible to improve the pore-clogging properties and the heat resistance at the same time to a certain degree. Such a tendency toward the improvement of the above-mentioned performance characteristics at the same time by this method, however, is an undesirable tendency for the quality of the membrane because the low-molecular weight component and the high-molecular weight component tend to separate from each other, resulting in low homogeneity of a starting material for the microporous membrane.

In addition, in patent documents 13 and 14, microporous membranes comprising a high-molecular weight polyethylene, a low-molecular weight polyethylene, a polypropylene and a low-melting polyethylene have been proposed. Such a method is also effective in improving the pore-clogging properties. It, however, is not desirable for the quality of the membrane because the thermal shrinkage stress at a high temperature is increased by the low-melting component and a starting material for the membrane is difficult to make homogeneous. Moreover, the membrane tends to have a high thermal shrinkage stress at a high temperature because it does not contain a sufficient amount of the low-molecular weight component.

Patent document 1: Japanese Patent No. 3113287
Patent document 2: JP-A-2003-217554
Patent document 3: JP-A-2003-231772
Patent document 4: JP-A-8-20659
Patent document 5: JP-A-10-17702
Patent document 6: JP-A-11-106533
Patent document 7: Japanese Patent No. 2657431
Patent document 8: Japanese Patent No. 3009495
Patent document 9: JP-A-11-92587
Patent document 10: Japanese Patent No. 2794179
Patent document 11: Japanese Patent No. 3305006
Patent document 12: Japanese Patent No. 3258737
Patent document 13: JP-A-2001-72788
Patent document 14: JP-A-2001-72792

DISCLOSURE OF THE INVENTION

Problem to be Solved by the Invention

The invention is directed to provide a microporous membrane made of polyolefins which possesses improved pore-clogging properties, resistance to thermal membrane breakage, thermal shrinkage characteristics and high-temperature strength without deterioration of the characteristics of conventional microporous membranes made of polyolefins, while retaining the membrane quality.

Means for Solving the Problem

The above problem has been solved for the first time by the invention. That is, the constitution of the invention is as follows.

(1) A microporous membrane made of polyolefins which comprises a polyethylene(s) (PEA) 8 to 60 wt % of which is accounted for by components having a molecular weight of 10,000 or less and in which the ratio of the weight-average molecular weight (Mw) to the number-average molecular weight (Mn), Mw/Mn, is 11 or more and 100 or less and the viscosity-average molecular weight (Mv) is 100,000 or more and 1,000,000 or less and a polypropylene(s) as essential constituents, and which has a content of components having a molecular weight of 10,000 or less of 8 to 60 wt %, a porosity of 20 to 95%, and a degree of thermal shrinkage at 100° C. of 10% or less.

(2) A microporous membrane made of polyolefins according to the above item (1), which comprises a polyethylene(s) (PEB) having a Mw/Mn ratio of 1 or more and 10 or less and a Mv value of 10,000 or more and 500,000 or less as an essential constituent in addition to the PEA and polypropylene(s) described in the above item (1).

(3) A microporous membrane made of polyolefins according to the above item (1), which comprises a polyethylene(s) (PEB) having a Mw/Mn ratio of 1 or more and 10 or less and a Mv value of 500,000 or more and 10,000,000 or less as an essential constituent in addition to the PEA and polypropylene(s) described in the above item (1).

(4) A microporous membrane made of polyolefins according to any one of the above items (1) to (3), wherein the approximate linear relationship based on least squares method between the common logarithm of the molecular weight $M(i)$ determined by GPC/FTIR and the value of terminal methyl group concentration $C(M(i))$ is as follows in the molecular weight $M(i)$ range of 100,000 or more and 1,000,000 or less:

$$C(M(i))=A\times\log(M(i))+B (A \text{ and } B \text{ are constants})-0.015\leq A\leq 2.000.$$

(5) A microporous membrane made of polyolefins according to any one of the above items (1) to (4), which has a degree of thermal shrinkage at 120° C. of 25% or less.

(6) A microporous membrane made of polyolefins according to any one of the above items (1) to (4), which has a degree of thermal shrinkage at 120° C. of 20% or less.

(7) A microporous membrane made of polyolefins according to any one of the above items (1) to (6), which has a TD thermal shrinkage stress at 150° C. of 600 kPa or less.

(8) A microporous membrane made of polyolefins according to any one of the above items (1) to (7), wherein the above-mentioned PEA is a polyethylene obtained by a multi-stage polymerization method.

(9) A microporous membrane made of polyolefins according to the above item (2) or (3), wherein the above-mentioned PEA shows at least two maximum or shoulder peaks in the molecular-weight distribution obtained by GPC and a maximum peak for the above-mentioned PEB is between a peak X for PEA (a peak for PEA on the low molecular weight side as a maximum or shoulder peak) and a peak Y for PEA (a peak for PEA on the high molecular weight side as a maximum or shoulder peak).

(10) A microporous membrane made of polyolefins according to the above item (9), which has a degree of thermal shrinkage at 120° C. of 25% or less.

(11) A microporous membrane made of polyolefins according to the above item (9), which has a degree of thermal shrinkage at 120° C. of 20% or less.

(12) A microporous membrane made of polyolefins according to the above item (9), which has a TD thermal shrinkage stress at 150° C. of 600 kPa or less.

(13) A microporous membrane made of polyolefins according to the above item (9), wherein the above-mentioned PEA is a polyethylene obtained by a multi-stage polymerization method.

(14) A process for producing a microporous membrane made of polyolefins according to any one of the above items (1) to (13), which comprises a step of melt-kneading polymer materials and a plasticizer, or polymer materials, a plasticizer and an inorganic agent, and extruding the resulting mixture; and a step of carrying out stretching and extraction of the plasticizer, or stretching, extraction of the plasticizer and optionally extraction of the inorganic agent, and then carrying out thermal fixation.

(15) A process for producing a microporous membrane made of polyolefins according to the above item (14), wherein the thermal fixation is carried out at a temperature of 100° C. or more and less than 135° C. and a relaxation rate of 0.6 to 0.9.

Advantages of the Invention

The microporous membrane made of polyolefins of the invention possesses improved pore-clogging properties, resistance to thermal membrane breakage, thermal shrinkage characteristics and high-temperature strength as compared with conventional microporous membranes made of polyolefins. Therefore, the safety of a cell can be improved by using the microporous membrane of the invention as a separator for cell. Furthermore, the microporous membrane having such good physical properties can be provided as a high-quality one.

BEST MODE FOR CARRYING OUT THE INVENTION

Figure 1:
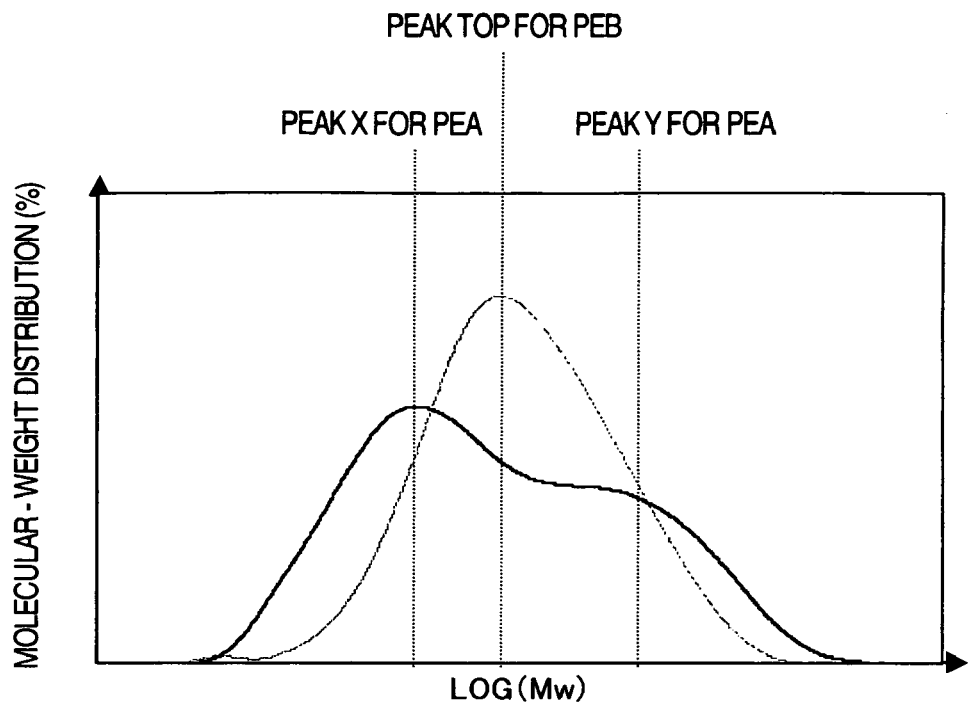
FIG. 1 is a graph showing an example of preferable relationship between the molecular-weight distributions of PEA and PEB which can be used in the invention.

The invention is described below in detail. The microporous membrane made of polyolefins of the invention comprises a polyethylene(s) (hereinafter abbreviated as PE in some cases) and a polypropylene(s) (hereinafter abbreviated as PP in some cases) as essential constituents and is preferably formed of a mixture of these polymers. More preferably, the polyethylene(s) is a main matrix.

The proportion of components having a molecular weight of 10,000 or less and the ratio of the weight-average molecular weight (Mw) to the number-average molecular weight (Mn), Mw/Mn, are determined by GPC measurement. The viscosity-average molecular weight (Mv) is calculated by measuring the intrinsic viscosity [η] at 135° C. in decalin solvent. The value of Mw is substantially the same as that of Mv. In the present specification, the average molecular weight is expressed in terms of Mv.

PEA and PEB, i.e., the polyethylenes constituting the microporous membrane made of polyolefins of the invention are explained below. As described above, in the present specification, the abbreviation "PEA" means a polyethylene 8 to 60 wt % of which is accounted for by components having a molecular weight of 10,000 or less and in which the ratio of Mw to Mn, Mw/Mn, is 11 or more and 100 or less and Mv is 100,000 or more and 1,000,000 or less. On the other hand, the abbreviation "PEB" means a polyethylene having a Mw/Mn ratio of 1 or more and 10 or less and a Mv value of 10,000 or more and less than 500,000, or a polyethylene having a Mw/Mn ratio of 1 or more and 10 or less and a Mv value of 500,000 or more and 10,000,000 or less.

The content of components with a molecular weight of 10,000 or less in PEA is 8 wt % or more, preferably 10 wt % or more, particularly preferably 15 wt % or more, from the viewpoint of pore-clogging properties. When the content is 8 wt % or more, the pore-clogging properties are improved and moreover, rapid relaxation of the thermal shrinkage stress of the microporous membrane itself is desirably caused in the interior of a cell subjected to a rapid temperature rise, for example, in an overcharge test or an oven test. On the other hand, the content of components with a molecular weight of 10,000 or less in PEA is 60 wt % or less, preferably 50 wt % or less, from the viewpoint of thermal shrinkage characteristics.

The Mw/Mn ratio of PEA is 11 or more and 100 or less, preferably 15 or more and 80 or less, more preferably 20 or more and 60 or less, from the viewpoint of pore-clogging properties and the ability of PEA to form a homogeneous mixture with PEB. The Mv value of PEA is 100,000 or more, preferably 150,000 or more, more preferably more than 300,000, from the viewpoint of the ability of PEA to form a homogeneous mixture with PEB and the polypropylene(s In addition, it is preferably 1,000,000 or less, preferably 800,000 or less. Such a PEA is suitably obtainable by multi-stage polymerization, and a two-stage polymerization product is preferable because of high productivity and easy availability. Such a PE obtainable by a two-stage polymerization method is preferably produced by polymerizing a low-molecular weight component by the first reaction and then polymerizing a high-molecular weight component by the second reaction, also from the viewpoint of productivity. The PE obtained by such a multi-stage polymerization method preferably shows two or more maximum or shoulder peaks in GPC measurement and preferably shows a maximum or shoulder peak at a molecular weight of $10^3$ to $10^5$ as a peak on the low molecular weight side and a maximum or shoulder peak at a molecular weight of $10^5$ to $10^7$ as a peak on the high molecular weight side.

The Mw/Mn ratio of PEB is 1 or more and 10 or less, preferably 5 or more and 10 or less, from the viewpoint of the ability of PEB to form a homogeneous mixture with PEA and the polypropylene(s). The Mv value of PEB is 10,000 or more and less than 500,000, preferably 50,000 or more and 300,000 or less, in a system in which importance is attached to the pore-clogging properties. On the other hand, the Mv value of PEB is 500,000 or more and 10,000,000 or less, preferably 700,000 or more and 7,000,000 or less, particularly preferably 1,000,000 or more and 5,000,000 or less, in a system in which importance is attached to the resistance to thermal membrane breakage and the high-temperature strength. Such a PEB can be suitably obtained by single-stage polymerization.

When PEA shows at least two maximum or shoulder peaks in the molecular-weight distribution obtained by GPC, a maximum peak for PEB added is preferably between a peak X for PEA (a peak for PEA on the low molecular weight side as a maximum or shoulder peak) and a peak Y for PEA (a peak for PEA on the high molecular weight side as a maximum or shoulder peak) as shown in FIG. 1. This is because such a membrane has a higher strength owing to its lower thermal shrinkage stress as compared with conventional microporous membranes comprising a blend of a low-molecular weight PE and a high-molecular weight PE, or a two-stage polymerization PE alone. In this case, the shoulder peaks include points of inflection, and the like.

As each of PEA and PEB, one or more polymers may be used. In addition, as each of the polyethylenes, either a homopolymer or a copolymer may be used. When a copolymer polyethylene is chosen, its comonomer content is preferably 2 mol % or less, more preferably 1 mol % or less, still more preferably 0.6 mol % or less, from the viewpoint of thermal shrinkage characteristics. The comonomer includes, for example, α-olefin comonomers such as propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene, etc.; cyclic olefin comonomers such as cyclopentene, cyclohexene, cycloheptene, norbornene, 5-methyl-2-norbornene, tetracyclododecene, 2-methyl-1.4,5.8-dimethano-1,2,3,4,4a,5,8,8a-octahydronaphthalene, etc.; compounds represented by the general formula $CH_2=CHR$ (wherein R is an aryl group of 6 to 20 carbon atoms), such as styrene, vinylcyclohexane, etc.; and linear, branched or cyclic dienes of 4 to 20 carbon atoms, such as 1,3-butadiene, 1,4-pentadiene, 1,5-hexadiene, 1,4-hexadiene, 1,6-octadiene, 1,7-octadiene, cyclohexadiene, etc. The α-olefin comonomers are especially preferable.

A polymerization catalyst for each of PEA and PEB includes Ziegler-Natta catalysts, Phillips catalysts, metallocene catalysts, and the like.

The proportion of PEA based on the total weight of all the materials constituting the membrane is preferably 10 wt % or more, more preferably 20 wt % or more, particularly preferably 50 wt % or more, from the viewpoint of pore-clogging properties and film-forming properties. In addition, the proportion is preferably 94 wt % or less, more preferably 90 wt % or less. The proportion of PEB is preferably 3 wt % or more, more preferably 5 wt % or more, from the viewpoint of pore-clogging properties, resistance to thermal membrane breakage, and film-forming properties. In addition, the proportion is preferably 90 wt % or less, more preferably 80 wt % or less, particularly preferably 50 wt % or less.

As the polypropylene(s) constituting the microporous membrane made of polyolefins of the invention, one or more polypropylenes may be used. The Mv value of the polypropylene is preferably 150,000 or more from the viewpoint of resistance to thermal membrane breakage and is preferably 700,000 or less from the viewpoint of membrane quality.

As the polypropylene(s) used, homopolymers, random copolymers and block copolymers are exemplified. The comonomer (usually, ethylene) content of the whole polypropylene(s) used is preferably 1.5 mol % or less, more preferably 1.0 mol % or less. A polymerization catalyst for the polypropylene(s) used is not particularly limited and includes Ziegler-Natta catalysts, metallocene catalysts, and the like.

The proportion of the polypropylene(s) based on the total weight of all the materials constituting the membrane is preferably 3 wt % or more, more preferably 5 wt % or more, still more preferably 7 wt % or more, from the viewpoint of resistance to thermal membrane breakage. In addition, the proportion is preferably 50 wt % or less from the viewpoint of film-forming properties, and is preferably 30 wt % or less, more preferably 15 wt % or less, from the viewpoint of physical properties balance between strength in piercing and air permeability, and membrane quality.

In the case of the microporous membrane made of polyolefins of the invention, the approximate linear relationship based on least squares method between the common logarithm of the molecular weight M(i) determined by GPC/FTIR and the value of terminal methyl group concentration C(M(i)) is preferably as follows in the molecular weight M(i) range of 100,000 or more and 1,000,000 or less:

$C(M(i))=A\times\log(M(i))+B$ ($A$ and $B$ are constants)–
$0.015 \leq A \leq 2.000$.

Each of the molecular-weight distribution and the terminal methyl group concentration determined by GPC/FTIR measurement is the sum of values for the polyolefins (e.g. the polyethylene(s) and the polypropylene(s)) constituting the microporous membrane of the invention. The molecular weight. M(i) is a molecular weight in terms of polyethylene. The terminal methyl group concentration C(M(i)) is defined as the ratio of absorbance I(—CH$_3$) (absorption wave number 2960 cm$^{-1}$) due to methyl group to absorbance I(—CH$_2$—) (absorption wave number 2925 cm$^{-1}$) due to methylene group, I(—CH$_3$)/I(—CH$_2$—). Here, C(M(i)) is the sum of a value for methyl groups at the ends of side chains of all the polymers and a value for methyl groups at the ends of the main chains of all the polymers. Since the methyl groups of the side chains of the polypropylene(s) greatly affect C(M(i)), the molecular-weight distribution of the polypropylene(s) in the membrane can be judged from the correlation between M(i) and C(M(i)).

In the invention, the constant A is preferably −0.015 or more and 2.0 or less, more preferably −0.012 or more and 1.0 or less, still more preferably 0 or more and 0.5 or less, in the approximate linear relationship based on least squares method between C(M(i)) and log M(i). A constant A value of less than −0.015 means that the amount of low-molecular weight components of the polypropylene(s) is much larger than that of high-molecular weight components of the polypropylene(s) in the membrane. This is undesirable from the viewpoint of resistance to thermal membrane breakage. From the viewpoint of film-forming properties and the like, it is substantially difficult to obtain a microporous membrane in which the constant A is more than 2.0. Although the range of the constant B is not particularly limited, the constant B is preferably about −5 to about 5 in view of the constant A.

It is known that since polypropylenes have a higher melting point than do polyethylenes, molded articles thereof have an excellent heat resistance. It is considered that the excellent resistance to thermal membrane breakage in rapid heating is attained in the invention because the polypropylene(s) is dispersed as a high-molecular weight substance and the polyethylene(s) specified in the present specification and containing low-molecular weight components and high-molecular weight components is effective in stress relaxation.

The content of components with a molecular weight of 10,000 or less in the microporous membrane made of polyolefins of the invention is 8 wt % or more, preferably 10 wt % or more, from the viewpoint of pore-clogging properties. In addition, the content is 60 wt % or less, preferably 50 wt % or less, from the viewpoint of thermal shrinkage characteristics.

The Mv value of the microporous membrane made of polyolefins of the invention is preferably 100,000 or more, more preferably 150,000 or more, from the viewpoint of heat resistance, membrane strength and film-forming properties. In addition, the Mv value is preferably 2,000,000 or less, more preferably 1,000,000 or less, still more preferably 800,000 or less, from the viewpoint of pore-clogging properties and film-forming properties.

The porosity of the microporous membrane made of polyolefins of the invention is 20% or more, preferably 25% or more, more preferably 30% or more, still more preferably 35% or more, from the viewpoint of permeability. In addition, the porosity is 95% or less, preferably 80% or less, more preferably 70% or less, still more preferably 60% or less, from the viewpoint of membrane strength.

The thickness of the microporous membrane made of polyolefins of the invention is preferably 3 μm or more, more preferably 5 μm or more, from the viewpoint of membrane strength. In addition, the thickness is preferably 100 μm or less, more preferably 50 μm or less, from the viewpoint of permeability.

The air permeability of the microporous membrane made of polyolefins of the invention is preferably 1 sec or more, more preferably 50 sec or more. In addition, the air permeability is preferably 2000 sec or less, more preferably 1000 sec or less, from the viewpoint of permeability.

The strength in piercing (a value at ordinary temperature, for example, 25° C.) of the microporous membrane made of polyolefins of the invention is preferably 0.7 to 20.0 N/20 μm, more preferably 2.5 to 20.0 N/20 μm. If the strength in piercing is less than 0.7 N/20 μm, the keen portion of an electrode member or the like pierces the microporous membrane to facilitate the formation of pinholes or cracks when the microporous membrane is used as a separator for cell.

The strength in piercing at 140° C. of the microporous membrane made of polyolefins of the invention is preferably 0.5 to 20.0 N/20 μm, more preferably 0.7 to 20.0 N/20 μm.

The pore-clogging temperature of the microporous membrane made of polyolefins of the invention is preferably 140° C. or lower, more preferably 138° C. or lower, under a rapid heating condition of 20° C./min from the viewpoint of the assurance of safety in heating of a cell. The thermal membrane breakage temperature is preferably 175° C. or higher, more preferably 190° C. or higher, under a rapid heating condition of 20° C./min from the viewpoint of the assurance of safety in heating of a cell.

The degree of thermal shrinkage of the microporous membrane made of polyolefins of the invention is 10% or less, preferably 8% or less, more preferably 6% or less, at 100° C. from the viewpoint of the assurance of safety in heating of a cell. At 120° C., the degree of thermal shrinkage is especially important at the time of heating, for example, in a recent cell safety test, and is preferably 25% or less, more preferably 20% or less, still more preferably 10% or less. The TD thermal shrinkage stress after pore clogging is preferably 600 kPa or less, more preferably 400 kPa or less, still more preferably 150 kPa or less, particularly preferably 120 kPa or less, at 150° C. without breakage of the membrane from the viewpoint of the assurance of safety in heating of a cell. In the production of such a thermal shrinkage stress, it is effective to adjust the content of components with a molecular weight of 10,000 or less in the whole membrane to 8 wt % or more. In addition, satisfying the conditions described hereinafter in a thermal fixation step is also effective in reducing the thermal shrinkage stress.

Thus, the microporous membrane made of polyolefins of the invention possesses improved high-temperature strength, pore-clogging properties, resistance to thermal membrane breakage, and thermal shrinkage characteristics as compared with conventional microporous membranes.

Next, a preferable example of process for producing the microporous membrane of the invention is explained below.

The microporous membrane of the invention can be obtained by melt-kneading polymer materials and a plasticizer, or polymer materials, a plasticizer and an inorganic agent, followed by extruding the resulting mixture; and carrying out stretching and extraction of the plasticizer, or stretching, extraction of the plasticizer and optionally extraction of the inorganic agent, followed by carrying out thermal fixation.

The inorganic agent used in the invention includes, for example, silica, alumina, titanium oxide and calcium carbonate.

Here, the plasticizer refers to a nonvolatile solvent capable of forming a homogeneous solution at a temperature not lower than the melting points of the polyolefin materials when mixed with these materials. The plasticizer includes, for example, hydrocarbons such as liquid paraffin, paraffin wax, etc., di-2-ethylhexyl phthalate (DOP), diisodecyl phthalate and diheptyl phthalate.

The total proportion by weight of the plasticizer and the inorganic agent based on the weight of the whole mixture to be melt-kneaded is preferably 20 to 95 wt %, more preferably 30 to 80 wt %, from the viewpoint of the permeability of the membrane and film-forming properties.

Incorporating an antioxidant is preferable for preventing heat deterioration during melt-kneading and the deterioration of the quality caused thereby. The concentration of the antioxidant is preferably 0.3 wt % or more, more preferably 0.5 wt % or more, based on the total weight of the polyolefins. In addition, the concentration is preferably 5.0 wt % or less, more preferably 3.0 wt % or less.

As the antioxidant, phenolic antioxidants, primary antioxidants are preferable. The antioxidant includes, for example, 2,6-di-t-butyl-4-methylphenol, pentaerythrityl-tetrakis-[3-(3,5-di-t-butyl-4-hydroxyphenyl)propionate] and octadecyl-3-(3,5-di-t-butyl-4-hydroxyphenyl) propionate. A secondary antioxidant may be co-used. The secondary antioxidant includes, for example, phosphorus-containing antioxidants such as tris(2,4-di-t-butylphenyl) phosphite, tetrakis(2,4-di-t-butylphenyl)-4,4-biphenylene-diphosphonite, etc.; and sulfur-containing antioxidants such as dilauryl-thio-dipropionate, etc.

It is also possible to co-use polyolefins other than the polyethylene(s) and polypropylene(s) specified in the present specification so long as they do not prevent the satisfaction of the conditions required in the invention. The other polyolefins include, for example, polyethylenes, methylpentene copolymers, and cyclic olefin copolymers such as ethyleneetetracyclododecene copolymers, ethylene-norbornene copolymers, etc. Each of them or a combination of two or more of them may be co-used. Polymers other than polyolefins and other organic materials may also be incorporated so long as they do not deteriorate the film-forming properties, do not prevent the satisfaction of the conditions required in the invention, and do not reduce the advantages of the invention.

In addition, if necessary, metallic soaps such as calcium stearate, zinc stearate, etc., and known additives such as ultraviolet absorbers, light stabilizers, antistatic agents, antifogging agents, coloring pigments, etc. may also be used in admixture with the other components so long as they do not deteriorate the film-forming properties, do not prevent the satisfaction of the conditions required in the invention and do not reduce the advantages of the invention.

As to a method for the melt-kneading and extrusion, some or all of raw materials are previously mixed at first in a Henschel mixer, a ribbon blender, a tumbling blender or the like if necessary. When their amount is small, they may be stirred by hand. Then, all the raw materials are melt-kneaded by means of a screw extruder (e.g. a single-screw extruder or a twin-screw extruder), a kneader, a mixer or the like and extruded through a T-die, a ring die or the like.

In the case of the microporous membrane made of polyolefins of the invention, the following is preferable: an antioxidant is mixed with the starting polymers to a predetermined concentration, followed by replacement with a nitrogen atmosphere, and the mixture is melt-kneaded while maintaining the nitrogen atmosphere. The temperature at the melt-kneading is preferably 160° C. or higher, more preferably 180° C. or higher. In addition, the temperature is preferably lower than 300° C., more preferably lower than 240° C., still more preferably lower than 230° C.

The melt referred to in the present specification may contain a non-molten inorganic agent extractable in an inorganic agent extraction step. The melt made homogeneous by melt-kneading may be passed through a screen in order to improve the membrane quality.

Then, sheet forming is conducted if necessary. As to a method for the sheet forming, the melt obtained by melt-kneading and extruded is solidified by compression and cooling. As a method for the cooling, there are exemplified a method of bringing the melt into direct contact with a cooling medium such as cold air or cooling water, and a method of bringing the melt into contact with a roll or pressing machine cooled with a refrigerant. The method of bringing the melt into contact with a roll or pressing machine cooled with a refrigerant is preferable because it permits satisfactory thickness control.

Subsequently, stretching and extraction of the plasticizer, or stretching, extraction of the plasticizer and extraction of the inorganic agent are carried out. Their order and number of operations are not particularly limited. When stretching and extraction of the plasticizer are carried out, examples of their order are stretching→extraction of the plasticizer; extraction of the plasticizer→stretching; and stretching→extraction of the plasticizer→stretching.

When stretching, extraction of the plasticizer and extraction of the inorganic agent are carried out, examples of their order are stretching→extraction of the plasticizer→extraction of the inorganic agent; extraction of the plasticizer→stretching→extraction of the inorganic agent; extraction of the plasticizer→extraction of the inorganic agent→stretching; stretching→extraction of the inorganic agent→extraction of the plasticizer; extraction of the inorganic agent→stretching→extraction of the plasticizer; extraction of the inorganic agent→extraction of the plasticizer→stretching; stretching→extraction of the plasticizer→stretching→extraction of the inorganic agent; and stretching→extraction of the plasticizer→extraction of the inorganic agent→stretching. The extraction of the inorganic agent is preferably carried out after the extraction of the plasticizer from the viewpoint of the efficiency of extraction. The extraction of the inorganic agent need not be carried out if not necessary.

As a stretching method adopted, there are exemplified MD uniaxial stretching (MD means machine direction) with a roll stretching machine, TD uniaxial stretching (TD means a direction perpendicular to machine direction) with a tenter, successive biaxial stretching with a combination of a roll stretching machine and a tenter, and simultaneous biaxial stretching with a simultaneous biaxial tenter or by inflation. The draw ratio is preferably 8 or more, more preferably 15 or more, most preferably 40 or more, in terms of total area ratio from the viewpoint of the uniformity of thickness of the membrane.

An extraction solvent used for the extraction of the plasticizer is preferably a solvent which is a poor solvent for the polyolefins constituting the membrane, is a good solvent for the plasticizer, and has a boiling point lower than the melting points of the polyolefins constituting the membrane. Such an extraction solvent includes, for example, hydrocarbons such as n-hexane, cyclohexane, etc.; alcohols such as methanol, ethanol, isopropanol, etc.; ketones such as acetone, methyl ethyl ketone, etc.; ethers such as tetrahydrofuran, etc.; and halogenated hydrocarbons such as methylene chloride, 1,1,1-trichloroethane, fluorocarbons, etc. These extraction solvents are used alone or as a mixture thereof by proper selection from them. In the extraction of the plasticizer, the plasticizer is extracted by a method such as immersion of the melt-kneaded product in the above-exemplified extraction solvent(s) or showering of the melt-kneaded product with the above-exemplified extraction solvent(s). Then, the melt-kneaded product is thoroughly dried.

As to a method for the thermal fixation, the stretched sheet is subjected to a relaxation procedure so as to attain a predetermined relaxation rate, in a predetermined temperature atmosphere. This procedure can be carried out by utilizing a tenter or a roll stretching machine. The relaxation procedure refers to a procedure of shortening the membrane in MD and/or TD. The term "relaxation rate" means a value obtained by dividing the MD size of the membrane after the relaxation procedure by the MD size of the membrane before the relaxation procedure, or a value obtained by dividing the TD size of the membrane after the relaxation procedure by the TD size of the membrane before the relaxation procedure, or a value obtained by multiplying the MD relaxation rate by the TD relaxation rate in the case of relaxation in both MD and TD. The predetermined temperature is preferably 100° C. or higher from the viewpoint of the degree of thermal shrinkage and is preferably lower than 135° C. from the viewpoint of porosity and permeability. The predetermined relaxation rate is preferably 0.9 or less, more preferably 0.8 or less, from the viewpoint of the degree of thermal shrinkage. In addition, the predetermined relaxation rate is preferably 0.6 or more from the viewpoint of the prevention of wrinkling, porosity and permeability. Although the relaxation procedure may be carried out in both directions MD and TD, the degree of thermal shrinkage can be reduced not only in a direction of the relaxation procedure but also a direction perpendicular thereto even by carrying out the relaxation procedure only in one of MD and TD.

If necessary, surface treatment such as electron beam irradiation, plasma irradiation, coating with a surfactant, chemical modification or the like may be carried out so long as it does not reduce the advantages of the invention.

The various physical properties employed in the present specification are measured on the basis of the following test methods.

(1) Calculation of the Constant A

The distribution of the molecular weight M(i) and the terminal methyl group concentration C(M(i)) in a microporous membrane are determined by GPC/FTIR measurement. M(i) is a molecular weight in terms of polyethylene. C(M(i)) is the ratio of absorbance I(—$CH_3$) (absorption wave number 2960 $cm^{-1}$) due to methyl group to absorbance I(—$CH_2$—) (absorption wave number 2925 $cm^{-1}$) due to methylene group, I(—$CH_3$)/I(—$CH_2$—). The constant A is obtained by linear approximation based on least squares method, with respect to the correlation between log M(i) and C(M(i)) in the molecular weight M(i) range of 100,000 or more and 1,000,000 or less.

$$C(M(i))=A\times\log(M(i))+B (A \text{ and } B \text{ are constants})$$

The GPC/FTIR measurement was carried out under the following conditions:
[Apparatus]
Model ALC/GPC 150C (trademark) mfd. by Waters Corporation
[Measuring Conditions]
Columns: AT-807S (trademark) (a column) mfd. by Showa Denko K.K. and GMH-HT6 (trademark) (two columns) mfd. by Tosoh Corporation are connected in a series.
Mobile phase: trichlorobenzene (TCB)
Column temperature: 140° C.
Flow rate: 1.0 ml/min
Sample preparation: 20 mg of a microporous membrane is dissolved in 20 ml of a 0.1 wt % solution of 2,6-di-t-butyl-4-methylphenol in TCB with heating at 140° C.
Detector: FT-IR 1760×(trademark) mfd. by PerkinElmer, Inc.

(2) Proportion of Components having a Molecular Weight of 10,000 or Less, and Mw/Mn Calculated on the basis of measurement by gel permeation chromatography (GPC). As an apparatus, Model ALC/GPC 150C (trademark) mfd. by Waters Corporation was used, and two 60 cm columns TSK-Gel GMH6-HT, a trade name, mfd. by Tosoh Corporation and a AT-807/S column, a trade name, mfd. by Showa Denko K.K. were used by connecting them in a series. The measurement was carried out at 140° C. by using 1,2,4-trichlorobenzene containing 10 ppm of pentaerythrityl-tetrakis-[3-(3,5-di-t-butyl-4-hydroxyphenyl) propionate], as a mobile phase solvent. A calibration curve was obtained by using a commercial monodisperse polystyrene with a known molecular weight as a standard substance. Molecular-weight distribution data in terms of polyethylene were obtained by multiplying molecular-weight distribution data in terms of polystyrene obtained for each sample by 0.43 (the Q factor of polyethylene/the Q factor of polystyrene=17.7/41.3).

(3) Viscosity-Average Molecular Weight Mv

Intrinsic viscosity [η] at 135° C. in decalin solvent was measured according to ASTM-D4020. The Mv value of a polyethylene was calculated by the following equation:

$$[\eta]=6.77\times10^{-4}Mv^{0.67}$$

The Mv value of a polypropylene was calculated by the following equation:

$$[\eta]=1.10\times10^{-4}Mv^{0.80}$$

The Mv value of a final membrane was calculated using the equation for polyethylene.

(4) α-Olefin Comonomer Content (mol %)

Calculated by dividing the integrated value in terms of mole of signal strengths due to comonomer units (A) in a $^{13}$C-NMR spectrum by the sum of (A) and the integrated value in terms of mole of signal strengths due to main monomer units (B), and multiplying the quotient by 100.

For example, in the case of a copolymer polyethylene obtained by using propylene as a comonomer, the content of the comonomer is calculated as follows: in the following structure model (1):

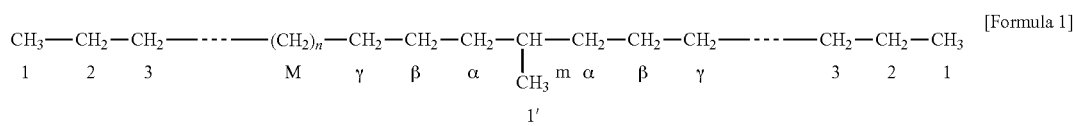

[Formula 1]

when $I_1$, $I_{1'}$, $I_2$, $I_3$, $I_\alpha$, $I_\beta$, $I_\gamma$, $I_m$ and $I_M$ are taken as signal strengths due to the corresponding carbon atoms, respectively, in a $^{13}$C-NMR spectrum, $$\text{comonomer content (mol \%)} = (A)/((A)+(B)) \times 100$$

wherein $$(A) = (I_{1'} + I_m + I_\alpha/2)/3,$$

$$(B) = (I_1 + I_2 + I_3 + I_M + I_\alpha/2 + I_\beta + I_\gamma)/2$$

therefore the above equation is arranged as follow by neglecting $I_1$, $I_2$ and $I_3$, because $I_m = I_{1'} = I_\alpha/2 = I_\beta/2 = I_\gamma/2$:

$$\text{comonomer content (mol \%)} = I_m/(I_M + (I_M + 5I_m)/2) \times 100.$$

(5) Membrane Thickness (μm)

Measured at room temperature of 23° C. with a micro-thickness meter KBM (trademark) mfd. by Toyo Seiki Seisaku-sho, Ltd.

(6) Porosity (%)

A specimen 10 cm square was cut out of a microporous membrane and the volume (cm$^3$) and mass (g) of the specimen were measured, after which the porosity was calculated from them and the density (g/cm$^3$) of the membrane by using the following equation:

$$\text{Porosity} = (\text{volume} - \text{mass/density of membrane})/\text{volume} \times 100$$

The calculation was carried out by taking the density of the membrane as a constant value 0.95.

(7) Air Permeability (sec)

Measured with a Gurley air permeability meter (G-B2, a trade name, mfd. by Toyo Seiki Seisaku-sho Ltd.) according to JIS P-8117.

(8) Strength in Piercing (N/20 μm)

An untreated value of strength in piercing (N) was obtained as maximum piercing load by carrying out a piercing test in a 23° C. atmosphere at a curvature radius of needle point of 0.5 mm and a piercing rate of 2 mm/sec with a KES-G5 Handy Compression Tester (trademark) mfd. by Kato tech Co., Ltd. By multiplying the untreated value (N) by 20 (μm)/membrane thickness (μm), strength in piercing in terms of 20 μm membrane thickness (N/20 μm) was calculated.

(9) 140° C. Strength in Piercing (N/20 μm)

A microporous membrane was fixed by holding it between two stainless steel washers with an inside diameter of 13 mm and an outside diameter of 25 mm, and was immersed in silicon oil (KF-96-10CS (trademark) Shin-Etsu Chemical Co., Ltd.) at 140° C. for 60 seconds. When the microporous membrane was not broken, it was subjected to a piercing test at a curvature radius of needle point of 0.5 mm and a piercing rate of 2 mm/sec with a KES-G5 Handy Compression Tester (trademark) mfd. by Kato tech Co., Ltd. to obtain an untreated value of 140° C. strength in piercing (N) as maximum piercing load. By multiplying the untreated value (N) by 20 (μm)/membrane thickness (μm), 140° C. strength in piercing in terms of 20 μm membrane thickness (N/20 μm) was calculated.

(10) Pore-Clogging Temperature in Rapid Heating (° C.) and Thermal Membrane Breakage Temperature in Rapid Heating (*C)

Figure 2:
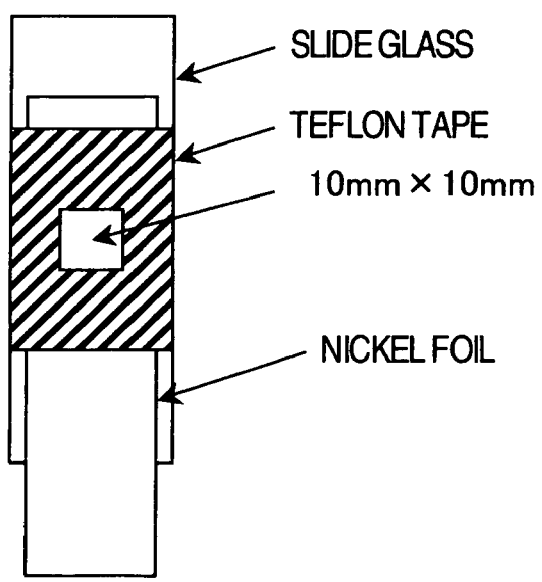
FIG. 2 is an illustration of a cell used for measurement of pore-clogging temperature in rapid heating and thermal membrane breakage temperature in rapid heating.

Two sheets (A and B) of nickel foil of 10 μm in thickness were prepared. One of the sheets of nickel foil, A was fixed on a slide glass with a Teflon (trademark) tape while masking the sheet A with the tape so that a square portion (10 mm long and 10 mm wide) of the sheet A might be remained non-masked (FIG. 2).

Figure 3:
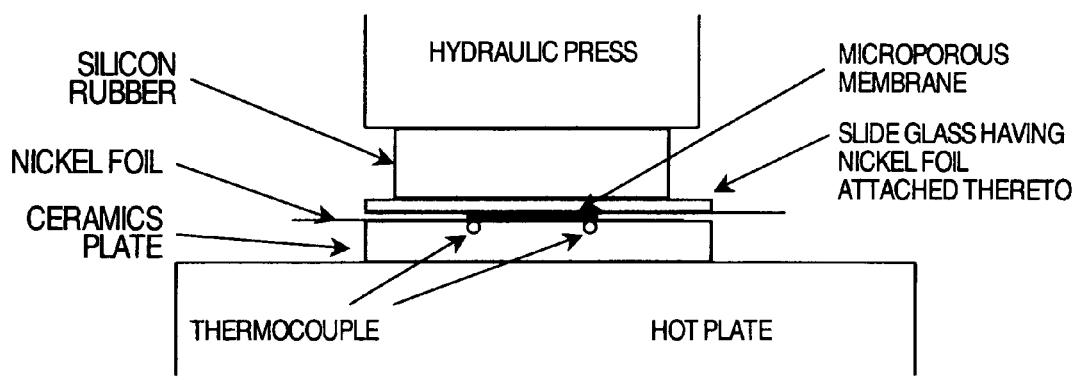
FIG. 3 shows a measuring apparatus used for measurement of pore-clogging temperature in rapid heating and thermal membrane breakage temperature in rapid heating.

The other sheet of nickel foil B was placed on a ceramics plate to which a thermocouple had been connected, and a microporous membrane as specimen for measurement sufficiently impregnated with a specified electrolysis solution by immersion in the electrolysis solution for 3 hours was placed on the sheet B. The slide glass having the nickel foil sheet A attached thereto was placed on the microporous membrane, and then silicone rubber was placed thereon (FIG. 3).

The resulting assembly was set on a hot plate and heated at a rate of 20° C./min while applying a pressure of 1.5 MPa with a hydraulic press. An impedance change in this case was measured with a LCR meter under conditions of an alternating current 1V and 1 kHz. In this measurement, a temperature at which the impedance reached 1000Ω was taken as the pore-clogging temperature in rapid heating, and a temperature at which the impedance became lower than 1000Ω thereafter was taken as the thermal membrane breakage temperature in rapid heating.

The composition of the specified electrolysis solution is as follows:

Compositional ratio (by volume) among solvents: propylene carbonate/ethylene carbonate/γ-butvllactone=1/1/2.

Proportion of a solute: $LiBF_4$ was dissolved in the above mixed solvent to a concentration of 1 mol/liter.

(11) Degree of Thermal Shrinkage

A specimen 12-cm square was cut out of a microporous membrane and four marks were placed thereon in MD and TD at a distance of 10 cm from each other. The specimen was held between two sheets of paper and allowed to stand in an oven at 100° C. (or 120° C. in the case of measurement at 120° C.) for 60 minutes. The specimen was taken out of the oven and cooled, after which the distance (cm) between the marks in each of MD and TD was measured and the degree of thermal shrinkage in each of MD and TD was calculated by the following equations:

$$\text{Degree of thermal shrinkage in MD (\%)} = (10 - \text{the distance in MD after the heating})/10 \times 100$$

$$\text{Degree of thermal shrinkage in TD (\%)} = (10 - \text{the distance in TD after the heating})/10 \times 100$$

(12) Thermal Shrinkage Stress (kPa)

Measured with TMA50 (trademark) mfd. by Shimadzu Corporation. A sample cut out in width of 3 mm in TD was fixed by means of chucks so that the distance between the chucks might be 10 mm, and the sample was set on a probe for exclusive use. An initial load was adjusted to 1.0 g and the probe was heated to 200° C. from 30° C. at a rate of 10° C./min. The shrinkage load (g) applied in this case was measured. From a load (g) at 150° C., the thermal shrinkage stress was calculated using the following equation:

$$\text{Thermal shrinkage stress (kPa)} = (\text{shrinkage load at } 150° \text{C.}/(3 \times t)) \times 100 \times 9.807 \times 10$$

wherein t: the thickness (μm) of the sample.

(13) Number of Defects

For a non-molten polymer gel of 0.3 mm$^2$ or more, the whole surfaces of samples in an amount corresponding to 50 m$^2$ were observed and the average number of defects per m$^2$ was determined.

EXAMPLES

The invention is illustrated with reference to the following examples.

Example 1

In a tumbling blender, 75 wt % of a homopolymer polyethylene (PEA) 31 wt % of which was accounted for by components having a molecular weight of 10,000 or less and which had a Mw/Mn ratio of 58 and a Mv value of 250,000, 15 wt % of a homopolymer polyethylene (PEB) having a Mw/Mn ratio of 8 and a Mv value of 2,000,000, and 10 wt % of a homopolymer polypropylene having a Mv value of 400,000 were dry-blended. To 99 wt % of the resulting mixture composed of only the polymers was added 1 wt % of pentaerythrityl-tetrakis-[3-(3,5-di-t-butyl-4-hydroxyphenyl) propionate] as antioxidant, and they were dry-blended in a tumbling blender to obtain a mixture of the polymers and the like. The obtained mixture of the polymers and the like was treated with nitrogen to replace the air, and was then fed to a twin-screw extruder with a feeder under a nitrogen atmosphere. Liquid paraffin (kinematic viscosity at 37.78° C.: $7.59 \times 10^{-5}$ m$^2$/s) was injected into the cylinder of the extruder with a plunger pump.

The feeder and the pump were adjusted so that the content of the liquid paraffin in the whole mixture to be extruded after melt kneading might be 55 wt %. The melt kneading was conducted under the following conditions: preset temperature 200° C., number of screw revolutions 240 rpm, and discharge rate 12 kg/h. Subsequently, the melt-kneaded product was extrusion-cast onto a chill roll controlled so as to have a surface temperature of 25° C., through a T-die to obtain a gel sheet of 1300 µm in thickness. Then, the gel sheet was introduced into a tenter simultaneous-biaxial-stretching machine and biaxially stretched. The preset stretching conditions were as follows: MD ratio 7.0, TD ratio 6.4, and preset temperature 118° C. Next, the gel sheet stretched was introduced into a methyl ethyl ketone vessel and sufficiently immersed in methyl ethyl ketone to extract and remove the liquid paraffin, after which the methyl ethyl ketone was removed by drying. Then, the gel sheet thus treated was introduced into a TD tenter and subjected to thermal fixation. The thermal fixation temperature was 105° C. and the TD relaxation rate was adjusted to 0.66. Table 1 shows the physical properties of the microporous membrane thus obtained.

Example 2

In a tumbling blender, 75 wt % of a copolymer polyethylene (PEA) 15 wt % of which was accounted for by components having a molecular weight of 10,000 or less and which had a Mw/Mn ratio of 20, a Mv value of 320,000, and a propylene content of 0.3 mol %, 7 wt % of a homopolymer polyethylene (PEB) having a Mw/Mn ratio of 9 and a Mv value of 4,500,000, and 18 wt % of the same polypropylene as in Example 1 were dry-blended. To 99 wt % of the resulting mixture composed of only the polymers was added 1 wt % of pentaerythrityl-tetrakis-[3-(3,5-di-t-butyl-4-hydroxyphenyl) propionate] as antioxidant, and they were dry-blended in a tumbling blender to obtain a mixture of the polymers and the like. The obtained mixture of the polymers and the like was treated with nitrogen to replace the air, and was then fed to a twin-screw extruder with a feeder under a nitrogen atmosphere. Liquid paraffin (kinematic viscosity at 37.78° C.: $7.59 \times 10^{-5}$ m$^2$/s) was injected into the cylinder of the extruder with a plunger pump.

The feeder and the pump were adjusted so that the content of the liquid paraffin in the whole mixture to be extruded after melt kneading might be 58 wt %. The melt kneading conditions were the same as in Example 1. Subsequently, the melt-kneaded product was extrusion-cast onto a chill roll controlled so as to have a surface temperature of 25° C., through a T-die to obtain a gel sheet of 2200 µm in thickness. Then, the gel sheet was introduced into a tenter simultaneous-biaxial-stretching machine and biaxially stretched. The preset stretching conditions were as follows: MD ratio 7.0, TD ratio 6.4, and preset temperature 126° C. Next, the gel sheet stretched was introduced into a methyl ethyl ketone vessel and sufficiently immersed in methyl ethyl ketone to extract and remove the liquid paraffin, after which the methyl ethyl ketone was removed by drying. Then, the gel sheet thus treated was introduced into a TD tenter and subjected to thermal fixation. The thermal fixation temperature was 120° C. and the TD relaxation rate was adjusted to 0.80. Table 1 shows the physical properties of the microporous membrane thus obtained.

Example 3

In a tumbling blender, 75 wt % of a homopolymer polyethylene (PEA) 45 wt % of which was accounted for by components having a molecular weight of 10,000 or less and which had a Mw/Mn ratio of 70 and a Mv value of 310,000, 18 wt % of a homopolymer polyethylene (PEB) having a Mw/Mn ratio of 9 and a Mv value of 3,000,000, and 7 wt % of the same polypropylene as in Example 1 were dry-blended. To 99 wt % of the resulting mixture composed of only the polymers was added 1 wt % of pentaerythrityl-tetrakis-[3-(3, 5-di-t-butyl-4-hydroxyphenyl) propionate] as antioxidant, and they were dry-blended in a tumbling blender to obtain a mixture of the polymers and the like. The obtained mixture of the polymers and the like was treated with nitrogen to replace the air, and was then fed to a twin-screw extruder with a feeder under a nitrogen atmosphere. Liquid paraffin (kinematic viscosity at 37.78° C.: $7.59 \times 10^{-5}$ m$^2$/s) was injected into the cylinder of the extruder with a plunger pump.

The feeder and the pump were adjusted so that the content of the liquid paraffin in the whole mixture to be extruded after melt kneading might be 70 wt %. The melt kneading conditions were the same as in Example 1. Subsequently, the melt-kneaded product was extrusion-cast onto a chill roll controlled so as to have a surface temperature of 25° C., through a T-die to obtain a gel sheet of 1000 µm in thickness. Then, the gel sheet was introduced into a tenter simultaneous-biaxial-stretching machine and biaxially stretched. The preset stretching conditions were as follows: MD ratio 7.0, TD ratio 6.4, and preset temperature 123° C. Next, the gel sheet stretched was introduced into a methyl ethyl ketone vessel and sufficiently immersed in methyl ethyl ketone to extract and remove the liquid paraffin, after which the methyl ethyl ketone was removed by drying. Then, the gel sheet thus treated was introduced into a TD tenter and subjected to thermal fixation. The thermal fixation temperature was 112° C. and the TD relaxation rate was adjusted to 0.73. Table 1 shows the physical properties of the microporous membrane thus obtained.

Example 4

In a tumbling blender, 50 wt % of the same PEA as in Example 1, 40 wt % of a homopolymer polyethylene (PEB) having a Mw/Mn ratio of 8 and a Mv value of 950,000, and 10 wt % of a random polymer polypropylene having a Mv value of 450,000 and an ethylene content of 0.9 mol % were dry-blended. In a Henschel mixer, 53 wt % of the resulting mixture composed of only the polymers, 1 wt % of pentaerythrityl-tetrakis-[3-(3,5-di-t-butyl-4-hydroxyphenyl) propionate] as antioxidant, 33 wt % of liquid paraffin (kinematic viscosity at 37.78° C.: $7.59 \times 10^{-5}$ m$^2$/s) and 13 wt % of finely-ground silica were mixed to obtain a mixture of the polymers and the like. The obtained mixture of the polymers and the like was treated with nitrogen to replace the air, and was then fed to a twin-screw extruder with a feeder under a nitrogen atmosphere. Liquid paraffin (kinematic viscosity at 37.78° C.: $7.59 \times 10^{-5}$ m²/s) was injected into the cylinder of the extruder with a plunger pump.

The feeder and the pump were adjusted so that the content of the liquid paraffin in the whole mixture to be extruded after melt kneading might be 60 wt %. The melt kneading conditions were the same as in Example 1. Subsequently, the melt-kneaded product was extrusion-cast onto a chill roll controlled so as to have a surface temperature of 25° C., through a T-die to obtain a gel sheet of 1500 μm in thickness. Then, the gel sheet was introduced into a tenter simultaneous-biaxial-stretching machine and biaxially stretched. The preset stretching conditions were the same as in Example 3. Next, the gel sheet stretched was introduced into a methyl ethyl ketone vessel and sufficiently immersed in methyl ethyl ketone to extract and remove the liquid paraffin, after which the methyl ethyl ketone was removed by drying. Furthermore, the gel sheet freed from the liquid paraffin was introduced into a sodium hydroxide vessel to extract and remove the silica, and washed and then dried. Thereafter, the gel sheet thus treated was introduced into a TD tenter and subjected to thermal fixation. The thermal fixation temperature and the TD relaxation rate were the same as in Example 3. Table 1 shows the physical properties of the microporous membrane thus obtained.

Example 5

In a tumbling blender, 90 wt % of the same PEA as in Example 1 and 10 wt % of the same polypropylene as in Example 1 were dry-blended. To 99 wt % of the resulting mixture composed of only the polymers was added 1 wt % of pentaerythrityl-tetrakis-[3-(3,5-di-t-butyl-4-hydroxyphenyl) propionate] as antioxidant, and they were dry-blended in a tumbling blender to obtain a mixture of the polymers and the like. The obtained mixture of the polymers and the like was treated with nitrogen to replace the air, and was then fed to a twin-screw extruder with a feeder under a nitrogen atmosphere. Liquid paraffin (kinematic viscosity at 37.78° C.: $7.59 \times 10^{-5}$ m²/s) was injected into the cylinder of the extruder with a plunger pump.

The feeder and the pump were adjusted so that the content of the liquid paraffin in the whole mixture to be extruded after melt kneading might be 55 wt %. The melt kneading conditions were the same as in Example 1. Subsequently, the melt-kneaded product was extrusion-cast onto a chill roll controlled so as to have a surface temperature of 25° C., through a T-die to obtain a gel sheet of 1300 μm in thickness. Then, the gel sheet was introduced into a tenter simultaneous-biaxial-stretching machine and biaxially stretched. The preset stretching conditions were the same as in Example 1. Next, the gel sheet stretched was introduced into a methyl ethyl ketone vessel and sufficiently immersed in methyl ethyl ketone to extract and remove the liquid paraffin, after which the methyl ethyl ketone was removed by drying. Then, the gel sheet thus treated was introduced into a TD tenter and subjected to thermal fixation. The thermal fixation temperature and the TD relaxation rate were the same as in Example 1. Table 1 shows the physical properties of the microporous membrane thus obtained.

Example 6

In a tumbling blender, 75 wt % of a homopolymer polyethylene (PEA) 15 wt % of which was accounted for by components having a molecular weight of 10,000 or less and which had a Mw/Mn ratio of 43 and a Mv value of 700,000, 15 wt % of a linear copolymer high-density polyethylene (comonomer: propylene; content 0.6 mol %) (PEB) having a Mw/Mn ratio of 7 and a Mv value of 120,000, and 10 wt % of a homopolymer polypropylene having a Mv value of 400,000 were dry-blended. To 99 wt % of the resulting mixture composed of only the polymers was added 1 wt % of pentaerythrityl-tetrakis-[3-(3,5-di-t-butyl-4-hydroxyphenyl) propionate] as antioxidant, and they were dry-blended in a tumbling blender to obtain a mixture of the polymers and the like. The obtained mixture of the polymers and the like was treated with nitrogen to replace the air, and was then fed to a twin-screw extruder with a feeder under a nitrogen atmosphere. Liquid paraffin (kinematic viscosity at 37.78° C.: $7.59 \times 10^{-5}$ m²/s) was injected into the cylinder of the extruder with a plunger pump.

The feeder and the pump were adjusted so that the content of the liquid paraffin in the whole mixture to be extruded after melt kneading might be 55 wt %. The melt kneading was conducted under the following conditions: preset temperature 200° C., number of screw revolutions 240 rpm, and discharge rate 12 kg/h. Subsequently, the melt-kneaded product was extrusion-cast onto a chill roll controlled so as to have a surface temperature of 25° C., through a T-die to obtain a gel sheet of 2100 μm in thickness. Then, the gel sheet was introduced into a tenter simultaneous-biaxial-stretching machine and biaxially stretched. The preset stretching conditions were as follows: MD ratio 7.0, TD ratio 6.4, and preset temperature 118° C. Next, the gel sheet stretched was introduced into a methyl ethyl ketone vessel and sufficiently immersed in methyl ethyl ketone to extract and remove the liquid paraffin, after which the methyl ethyl ketone was removed by drying. Then, the gel sheet thus treated was introduced into a TD tenter and subjected to thermal fixation. The thermal fixation temperature was 105° C. and the TD relaxation rate was adjusted to 0.80. Table 1 shows the physical properties of the microporous membrane thus obtained.

Example 7

In a tumbling blender, 75 wt % of a homopolymer polyethylene (PEA) 15 wt % of which was accounted for by components having a molecular weight of 10,000 or less and which had a Mw/Mn ratio of 43 and a Mv value of 700,000, 15 wt % of a high-density homopolyethylene (PEB) having a Mw/Mn ratio of 8 and a Mv value of 300,000, and 10 wt % of a homopolymer polypropylene having a Mv value of 400,000 were dry-blended. To 99 wt % of the resulting mixture composed of only the polymers was added 1 wt % of pentaerythrityl-tetrakis-[3-(3,5-di-t-butyl-4-hydroxyphenyl) propionate] as antioxidant, and they were dry-blended in a tumbling blender to obtain a mixture of the polymers and the like. The obtained mixture of the polymers and the like was treated with nitrogen to replace the air, and was then fed to a twin-screw extruder with a feeder under a nitrogen atmosphere. Liquid paraffin (kinematic viscosity at 37.78° C.: $7.59 \times 10^{-5}$ m²/s) was injected into the cylinder of the extruder with a plunger pump.

The feeder and the pump were adjusted so that the content of the liquid paraffin in the whole mixture to be extruded after melt kneading might be 55 wt %. The melt kneading was conducted under the following conditions: preset temperature 200° C., number of screw revolutions 240 rpm, and discharge rate 12 kg/h. Subsequently, the melt-kneaded product was extrusion-cast onto a chill roll controlled so as to have a surface temperature of 25° C., through a T-die to obtain a gel sheet of 2100 μm in thickness. Then, the gel sheet was introduced into a tenter simultaneous-biaxial-stretching machine and biaxially stretched. The preset stretching conditions were as follows: MD ratio 7.0, TD ratio 6.4, and preset temperature 118° C. Next, the gel sheet stretched was introduced into a methyl ethyl ketone vessel and sufficiently immersed in methyl ethyl ketone to extract and remove the liquid paraffin, after which the methyl ethyl ketone was removed by drying. Then, the gel sheet thus treated was introduced into a TD tenter and subjected to thermal fixation. The thermal fixation temperature was 115° C. and the TD relaxation rate was adjusted to 0.80. Table 1 shows the physical properties of the microporous membrane thus obtained.

Example 8

The following were mixed: 30 wt % of a homopolymer polyethylene (PEA) 15 wt % of which was accounted for by components having a molecular weight of 10,000 or less and which had a Mw/Mn ratio of 43 and a Mv value of 700,000, 15 wt % of a high-density homopolyethylene (PEB) having a Mw/Mn ratio of 8 and a Mv value of 300,000, 5 wt % of a homopolymer polypropylene having a Mv value of 400,000, 30.6 wt % of dioctyl phthalate (DOP), 18.4 wt % of finely-ground silica and 1 wt % of pentaerythrityl-tetrakis-[3-(3,5-di-t-butyl-4-hydroxyphenyl) propionate] as antioxidant. The resulting mixture of the polymers and the like was treated with nitrogen to replace the air, and was then fed to a twin-screw extruder with a feeder under a nitrogen atmosphere.

Melt kneading was conducted under the following conditions: preset temperature 200° C., number of screw revolutions 240 rpm, and discharge rate 12 kg/h. Subsequently, the melt-kneaded product was extrusion-cast onto a chill roll controlled so as to have a surface temperature of 80° C., through a T-die to obtain gel sheets of 110 μm in thickness. The DOP and the finely-ground silica were extracted and removed from the gel sheets to obtain microporous membranes. Two of the microporous membranes were placed one over the other and stretched at a ratio of 5 in the lengthwise direction at 110° C., after which they were introduced into a TD tenter and stretched at a ratio of 2 in the crosswise direction at 130° C. The TD relaxation rate after the stretching was adjusted to 0.80. Table 1 shows the physical properties of the microporous membrane obtained.

Example 9

In a tumbling blender, 75 wt % of a homopolymer polyethylene (PEA) 20 wt % of which was accounted for by components having a molecular weight of 10,000 or less and which had a Mw/Mn ratio of 43 and a Mv value of 550,000, 15 wt % of an ethylene-hexene copolymer (hexene content 2 mol %) (PEB) having a Mw/Mn ratio of 6 and a Mv value of 120,000, and 10 wt % of a homopolymer polypropylene having a Mv value of 400,000 were dry-blended. To 99 wt % of the resulting mixture composed of only the polymers was added 1 wt % of pentaerythrityl-tetrakis-[3-(3,5-di-t-butyl-4-hydroxyphenyl) propionate] as antioxidant, and they were dry-blended in a tumbling blender to obtain a mixture of the polymers and the like. The obtained mixture of the polymers and the like was treated with nitrogen to replace the air, and was then fed to a twin-screw extruder with a feeder under a nitrogen atmosphere. Liquid paraffin (kinematic viscosity at 37.78° C.: 7.59×10$^{-5}$ m$^2$/s) was injected into the cylinder of the extruder with a plunger pump.

The feeder and the pump were adjusted so that the content of the liquid paraffin in the whole mixture to be extruded after melt kneading might be 55 wt %. The melt kneading was conducted under the following conditions: preset temperature 200° C., number of screw revolutions 240 rpm, and discharge rate 12 kg/h. Subsequently, the melt-kneaded product was extrusion-cast onto a chill roll controlled so as to have a surface temperature of 25° C., through a T-die to obtain a gel sheet of 2000 μm in thickness. Then, the gel sheet was introduced into a tenter simultaneous-biaxial-stretching machine and biaxially stretched. The preset stretching conditions were as follows: MD ratio 7.0, TD ratio 6.4, and preset temperature 115° C. Next, the gel sheet stretched was introduced into a methyl ethyl ketone vessel and sufficiently immersed in methyl ethyl ketone to extract and remove the liquid paraffin, after which the methyl ethyl ketone was removed by drying. Then, the gel sheet thus treated was introduced into a TD tenter and subjected to thermal fixation. The thermal fixation temperature was 110° C. and the TD relaxation rate was adjusted to 0.70. Table 1 shows the physical properties of the microporous membrane thus obtained.

Comparative Example 1

In a tumbling blender, 85 wt % of a homopolymer polyethylene 6 wt % of which was accounted for by components having a molecular weight of 10,000 or less and which had a Mw/Mn ratio of 7 and a Mv value of 270,000, and 15 wt % of a homopolymer polyethylene having a Mw/Mn ratio of 9 and a Mv value of 3,000,000 were dry-blended. To 99 wt % of the resulting mixture composed of only the polymers was added 1 wt % of pentaerythrityl-tetrakis-[3-(3,5-di-t-butyl-4-hydroxyphenyl) propionate] as antioxidant, and they were dry-blended in a tumbling blender to obtain a mixture of the polymers and the like. The obtained mixture of the polymers and the like was treated with nitrogen to replace the air, and was then fed to a twin-screw extruder with a feeder under a nitrogen atmosphere. Liquid paraffin (kinematic viscosity at 37.78° C.: 7.59×10$^{-5}$ m$^2$/s) was injected into the cylinder of the extruder with a plunger pump.

The feeder and the pump were adjusted so that the content of the liquid paraffin in the whole mixture to be extruded after melt kneading might be 65 wt %. The melt kneading conditions were the same as in Example 1. Subsequently, the melt-kneaded product was extrusion-cast onto a chill roll controlled so as to have a surface temperature of 25° C., through a T-die to obtain a gel sheet of 1200 μm in thickness. Then, the gel sheet was introduced into a tenter simultaneous-biaxial-stretching machine and biaxially stretched. The preset stretching conditions were the same as in Example 1. Next, the gel sheet stretched was introduced into a methyl ethyl ketone vessel and sufficiently immersed in methyl ethyl ketone to extract and remove the liquid paraffin, after which the methyl ethyl ketone was removed by drying. Then, the gel sheet thus treated was introduced into a TD tenter and subjected to thermal fixation. The thermal fixation temperature was 123° C. and the TD relaxation rate was adjusted to 1.00. Many defects were observed in the microporous membrane thus obtained and this membrane had no quality required of a separator for cell. Table 1 shows the physical properties of the microporous membrane obtained.

Comparative Example 2

In a tumbling blender, 85 wt % of the same PEA as in Example 1 and 15 wt % of the same PEB as in Example 1 were dry-blended. To 99 wt % of the resulting mixture composed of only the polymers was added 1 wt % of pentaerythrityl-tetrakis-[3-(3,5-di-t-butyl-4-hydroxyphenyl) propionate] as antioxidant, and they were dry-blended in a tumbling blender to obtain a mixture of the polymers and the like. The obtained mixture of the polymers and the like was treated with nitrogen to replace the air, and was then fed to a twin-screw extruder with a feeder under a nitrogen atmosphere. Liquid paraffin (kinematic viscosity at 37.78° C.: 7.59×10$^{-5}$ m$^2$/s) was injected into the cylinder of the extruder with a plunger pump.

The feeder and the pump were adjusted so that the content of the liquid paraffin in the whole mixture to be extruded after melt kneading might be 55 wt %. The melt kneading conditions were the same as in Example 1. Subsequently, the melt-kneaded product was extrusion-cast onto a chill roll controlled so as to have a surface temperature of 25° C., through a T-die to obtain a gel sheet of 1300 μm in thickness. Then, the gel sheet was introduced into a tenter simultaneous-biaxial-stretching machine and biaxially stretched. The preset stretching conditions were the same as in Example 2. Next, the gel sheet stretched was introduced into a methyl ethyl ketone vessel and sufficiently immersed in methyl ethyl ketone to extract and remove the liquid paraffin, after which the methyl ethyl ketone was removed by drying. Then, the gel sheet thus treated was introduced into a TD tenter and subjected to thermal fixation. The thermal fixation temperature and the TD relaxation rate were the same as in Example 1. Table 1 shows the physical properties of the microporous membrane thus obtained.

Comparative Example 3

To 99 wt % of the same PEA as in Example 6 was added 1 wt % of pentaerythrityl-tetrakis-[3-(3,5-di-t-butyl-4-hydroxyphenyl) propionate] as antioxidant, and they were dry-blended in a tumbling blender to obtain a mixture of the polymer and the like. The obtained mixture of the polymer and the like was treated with nitrogen to replace the air, and was then fed to a twin-screw extruder with a feeder under a nitrogen atmosphere. Liquid paraffin (kinematic viscosity at 37.78° C.: 7.59×10$^{-5}$ m$^2$/s) was injected into the cylinder of the extruder with a plunger pump.

The feeder and the pump were adjusted so that the content of the liquid paraffin in the whole mixture to be extruded after melt kneading might be 55 wt %. The melt kneading conditions were the same as in Example 1. Subsequently, the melt-kneaded product was extrusion-cast onto a chill roll controlled so as to have a surface temperature of 25° C., through a T-die to obtain a gel sheet of 2100 μm in thickness. Then, the gel sheet was introduced into a tenter simultaneous-biaxial-stretching machine and biaxially stretched. The preset stretching conditions were the same as in Example 6. Next, the gel sheet stretched was introduced into a methyl ethyl ketone vessel and sufficiently immersed in methyl ethyl ketone to extract and remove the liquid paraffin, after which the methyl ethyl ketone was removed by drying. Then, the gel sheet thus treated was introduced into a TD tenter and subjected to thermal fixation. The thermal fixation temperature and the TD relaxation: rate were the same as in Example 6. Table 1 shows the physical properties of the microporous membrane thus obtained.

Comparative Example 4

In a tumbling blender, 70 wt % of a homopolymer polyethylene 15 wt % of which was accounted for by components having a molecular weight of 10,000 or less and which had a Mw/Mn ratio of 7 and a Mv value of 100,000, 20 wt % of a homopolymer polyethylene having a Mw/Mn ratio of 9 and a Mv value of 3,000,000, and 10 wt % of a homopolymer polypropylene having a Mv value of 400,000 were dry-blended. To 99 wt % of the resulting mixture composed of only the polymers was added 1 wt % of pentaerythrityl-tetrakis-[3-(3,5-di-t-butyl-4-hydroxyphenyl) propionate] as antioxidant, and they were dry-blended in a tumbling blender to obtain a mixture of the polymers and the like. The obtained mixture of the polymers and the like was treated with nitrogen to replace the air, and was then fed to a twin-screw extruder with a feeder under a nitrogen atmosphere. Liquid paraffin (kinematic viscosity at 37.78° C.: 7.59×10$^{-5}$ m$^2$/s) was injected into the cylinder of the extruder with a plunger pump.

The feeder and the pump were adjusted so that the content of the liquid paraffin in the whole mixture to be extruded after melt kneading might be 65 wt %. The melt kneading conditions were the same as in Example 1. Subsequently, the melt-kneaded product was extrusion-cast onto a chill roll controlled so as to have a surface temperature of 25° C., through a T-die to obtain a gel sheet of 1200 μm in thickness. Then, the gel sheet was introduced into a tenter simultaneous-biaxial-stretching machine and biaxially stretched. The preset stretching conditions were the same as in Example 1. Next, the gel sheet stretched was introduced into a methyl ethyl ketone vessel and sufficiently immersed in methyl ethyl ketone to extract and remove the liquid paraffin, after which the methyl ethyl ketone was removed by drying. Then, the gel sheet thus treated was introduced into a TD tenter and subjected to thermal fixation. The thermal fixation temperature was 115° C. and the TD relaxation rate was adjusted to 0.75. Many defects were observed in the microporous membrane thus obtained and this membrane had no quality required of a separator for cell. Table 1 shows the physical properties of the microporous membrane obtained.

Comparative Example 5

In a tumbling blender, 30 wt % of a homopolymer polyethylene having a Mw/Mn ratio of 7 and a Mv value of 2,000,000, 40 wt % of a homopolymer high-density polyethylene having a Mw/Mn ratio of 6 and a Mv value of 300,000, 10 wt % of an ethylene-octene copolymer (octene content 12.0 mol % and melting point 100° C.) having a Mw/Mn ratio of 3 and a Mv value of 70,000, and 20 wt % of a homopolymer polypropylene having a Mv value of 400,000 were dry-blended. Thereafter, the same procedure as in Comparative Example 4 was carried out except for changing the thermal fixation temperature to 120° C. Many defects were observed in the microporous membrane thus obtained and this membrane had no quality required of a separator for cell. Table 1 shows the physical properties of the microporous membrane obtained.

[Table 1-1]

TABLE 1

|   |   | Example 1 | Example 2 | Example 3 | Example 4 | Example 5 | Example 6 | Example 7 | Example 8 |
|---|---|---|---|---|---|---|---|---|---|
| A | (—) | 0.008 | 0.006 | 0.009 | 0.008 | 0.008 | 0.008 | 0.008 | 0.008 |
| Proportion of components having a molecular weight of | (wt %) | 25 | 10 | 35 | 15 | 28 | 25 | 20 | 20 |

TABLE 1-continued

| | | | | | | | | | |
|---|---|---|---|---|---|---|---|---|---|
| 10,000 or less | | | | | | | | | |
| Mv | (—) | 480,000 | 570,000 | 800,000 | 510,000 | 310,000 | 500,000 | 550,000 | 550,000 |
| Average number of defects | (defects/m²) | 0 | 0 | 0 | 0 | 0 | 0 | 0 | 0 |
| Thickness | (μm) | 22 | 30 | 9 | 24 | 23 | 20 | 20 | 22 |
| Porosity | (%) | 42 | 37 | 46 | 44 | 44 | 42 | 40 | 45 |
| Air permeability | (sec) | 380 | 880 | 140 | 280 | 300 | 270 | 330 | 90 |
| Strength in piercing | (N/20 μm) | 7.2 | 4.2 | 6.1 | 4.5 | 7.4 | 5.9 | 6.4 | 4.2 |
| 140° C. strength in piecing | (N/20 μm) | 1.0 | 0.8 | 1.2 | 0.8 | 0.4 | 0.7 | 0.7 | 0.5 |
| Pore-clogging temperature in rapid heating | (° C.) | 137 | 138 | 133 | 138 | 137 | 135 | 136 | 136 |
| Thermal membrane breakage temperature in rapid heating | (° C.) | >200 | >200 | >200 | >200 | >200 | >200 | >200 | >200 |
| 100° C. thermal shrinkage | (MD/TD(%)) | 8/6 | 5/2 | 5/3 | 8/6 | 8/6 | 7/5 | 5/4 | 6/1 |
| 120° C. thermal shrinkage | (MD/TD(%)) | 15/13 | 12/11 | 13/11 | 17/16 | 19/18 | 12/10 | 9/8 | 9/10 |
| Thermal shrinkage stress | (kPa) | 100 | 90 | 100 | 91 | 100 | 140 | 250 | 30 |

| | | Example 9 | Comparative Example 1 | Comparative Example 2 | Comparative Example 3 | Comparative Example 4 | Comparative Example 5 |
|---|---|---|---|---|---|---|---|
| A | (—) | 0.008 | 0.000 | 0.000 | 0.000 | 0.007 | 0.007 |
| Proportion of components having a molecular weight of 10,000 or less | (wt %) | 18 | 5 | 26 | 27 | 9 | 6 |
| Mv | (—) | 420,000 | 620,000 | 490,000 | 550,000 | 500,000 | 500,000 |
| Average number of defects | (defects/m²) | 0 | 60 | 0 | 0 | 75 | 5 |
| Thickness | (μm) | 20 | 17 | 20 | 20 | 20 | 20 |
| Porosity | (%) | 40 | 44 | 41 | 42 | 40 | 38 |
| Air permeability | (sec) | 350 | 230 | 580 | 250 | 400 | 450 |
| Strength in piercing | (N/20 μm) | 4.5 | 6.4 | 4.8 | 5.9 | 4.9 | 4.4 |
| 140° C. strength in piecing | (N/20 μm) | 0.6 | 0.3 | 0.8 | 0.2 | 0.2 | 0.3 |
| Pore-clogging temperature in rapid heating | (° C.) | 134 | 146 | 134 | 136 | 140 | 128 |
| Thermal membrane breakage temperature in rapid heating | (° C.) | >200 | 154 | 155 | 154 | >200 | >200 |
| 100° C. thermal shrinkage | (MD/TD(%)) | 7/6 | 10/14 | 6/4 | 6/4 | 12/11 | 6/5 |
| 120° C. thermal shrinkage | (MD/TD(%)) | 17/16 | 27/26 | 17/16 | 22/21 | 19/18 | 23/21 |
| Thermal shrinkage stress | (kPa) | 260 | 200 | 88 | 90 | 420 | 620 |

INDUSTRIAL APPLICABILITY

The microporous membrane made of polyolefins of the invention relates to a microporous membrane used, for example, for separation and selective permeation of substances and as a separating member, and is suitably used as, in particular, a separator for lithium ion cell or the like.

The invention claimed is:

1. A process for producing a microporous membrane which comprises
    a step of melt-kneading polymer materials comprising at least one polyethylene (PEA), wherein 8 to 60 wt % of said PEA is accounted for by components having a molecular weight of 10,000 or less and in which the ratio of the weight-average molecular weight (Mw) to the number-average molecular weight (Mn), Mw/Mn, is 11 or more and 100 or less and the viscosity-average molecular weight (Mv) is 100,000 or more and 1,000,000 or less, and
    at least one polyethylene (PEB), which has a Mw/Mn ratio of 1 or more and 10 or less;
    wherein said PEA shows at least two maximum or shoulder peaks in the molecular weight distribution obtained by gel permeation chromatography and said PEB has a maximum peak between a peak X that is a peak for PEA on the low molecular weight side as a maximum or shoulder peak, and a peak Y that is a peak for PEA on the high molecular weight side as a maximum or shoulder peak,
    and at least one polypropylene,
    and a plasticizer,
    or said polymer materials comprising PEA, PEB and polypropylene, a plasticizer and an inorganic agent, and extruding the resulting mixture; and
    a step of carrying out stretching and extraction of the plasticizer,
    and then carrying out thermal fixation to produce a microporous membrane comprising 8-60 wt. % components having a molecular weight of 10,000 or less, a porosity of 20 to 95%, and a degree of thermal shrinkage at 100° C. of 10% or less.

2. A process for producing a microporous membrane according to claim 1, wherein the thermal fixation is carried out at a temperature of 100° C. or more and less than 135° C. and a relaxation rate of 0.6 to 0.9.

3. The process of claim 1, wherein said step of carrying out stretching and extraction of the plasticizer additionally comprises extracting the inorganic agent when present.

4. The process of claim 1, wherein said PEA shows a maximum or shoulder peak X at a molecular weight of $10^3$ to $10^5$ as a peak on the low molecular weight side and a maximum or shoulder peak Y at a molecular weight of $10^5$ to $10^7$ as a peak on the high molecular weight side.

* * * * *